US006820922B2

United States Patent
Staus et al.

(10) Patent No.: US 6,820,922 B2
(45) Date of Patent: Nov. 23, 2004

(54) WEATHERSEAL ASSEMBLY, ESPECIALLY FOR SEALING AN AUTOMOTIVE TRIM ITEM

(75) Inventors: Steffen Staus, Lindau (DE); Rolf Brocke, Wangen (DE)

(73) Assignee: Metzeler Automotive Profile Systems GmbH, Lindau (DE)

( * ) Notice: Subject to any disclaimer, the term of this patent is extended or adjusted under 35 U.S.C. 154(b) by 0 days.

(21) Appl. No.: 10/647,555

(22) Filed: Aug. 25, 2003

(65) Prior Publication Data

US 2004/0090084 A1 May 13, 2004

(30) Foreign Application Priority Data

Aug. 26, 2002 (DE) .......................................... 102 39 076

(51) Int. Cl.[7] .............................................. B60J 10/04
(52) U.S. Cl. ........................ 296/154; 296/1.08; 49/377
(58) Field of Search ............................. 296/154, 146.5, 296/146.7, 146.9, 1.08, 93, 213; 49/502, 377, 490.1, 498.1, 475.1; 52/716.8, 800.13

(56) References Cited

FOREIGN PATENT DOCUMENTS

| DE | 44 09 326 A1 | 3/1994 |
|---|---|---|
| WO | WO 01/87658 A1 | 11/2001 |

*Primary Examiner*—Patricia L. Engle
(74) *Attorney, Agent, or Firm*—Stephen B. Salai, Esq.; Harter, Secrest & Emery LLP

(57) ABSTRACT

A weatherseal assembly is provided with a body part (14) and a weatherseal (20). The weatherseal (20) includes a sealing portion (21) and a fastening portion (22). The sealing portion (21) is provided with a pivotable sealing lip (23) and an abutment lip (24) leading said sealing lip (23) such that when the abutment lip (24) comes into contact with the body part (14) the sealing lip (23) is pivotable from a first position (I) into a second position (II) contacting the body part (14). To achieve a wanted pivoting action and a relatively high contact force of the sealing lip (23) the abutment lip (24) comprises a first leg (25) and a second leg (26) extending at an angle ($\alpha$) to the first leg (25) in the first position (I). The first leg (25) is connected at one end to the sealing lip (23) and at the other end to the second leg (26). The second leg (26) is deformable by the body part (14) such that the first leg (25) moves the sealing lip (23) from the first position (I) into the second position (II).

12 Claims, 2 Drawing Sheets

WEATHERSEAL ASSEMBLY, ESPECIALLY FOR SEALING AN AUTOMOTIVE TRIM ITEM

CROSS-REFERENCE TO RELATED APPLICATIONS

This application claims priority of German Patent Application No. 102 39 076.2, filed Aug. 26, 2002.

STATEMENT REGARDING FEDERALLY SPONSORED RESEARCH OR DEVELOPMENT

Not applicable

REFERENCE TO A "SEQUENCE LISTING"

Not applicable.

BACKGROUND OF THE INVENTION

1. Field of the Invention

The invention relates to a weatherseal assembly, especially for sealing a trim item arranged on a motor vehicle. The weatherseal assembly involves a body part and a weatherseal comprising a sealing portion and a fastening portion. The sealing portion is provided with a pivotable sealing lip and an abutment lip leading the sealing lip. When the abutment lip comes into contact with the body part the sealing lip is pivotable from a first portion into a second portion contacting the body part.

2. Background Art

One such weatherseal assembly reads from WO 01/87658 A1. This known weatherseal assembly serves to seal a powered automotive window from the door cavity accommodating the window. For this purpose the known weatherseal assembly is made up of a weatherseal secured to a flange of the door cavity facing the outer side of the vehicle, and an inner seal secured to a flange of the door cavity facing the vehicle passenger compartment. The inner seal comprises a pivotable sealing lip serving to seal a trim item arranged in the vehicle passenger compartment. In addition, the inner seal is provided with an abutment lip leading the sealing lip and projecting more or less orthoganally from the sealing lip. The abutment lip is arranged such that, when it is fitted, the trim item first comes into contact with the abutment lip. It is in this way that the abutment lip functions as a slaving member which urges the pivotable sealing lip into contact with the trim item to thus achieve sealing contact of the sealing lip with the trim item.

One disadvantage with this known weatherseal assembly is its lack of variability as regards fitting the trim item, since the abutment lip will only implement its function as a slaving member when the trim item is moved primarily orthogonally to the abutment lip. In addition, it has turned out to be unsatisfactory that the force with which the sealing lip is urged into contact with the trim item is insufficient.

BRIEF SUMMARY OF THE INVENTION

The invention is based on the objective of sophisticating a weatherseal assembly of the aforementioned kind such that pivoting the sealing lip with a relatively high contact force is now achieved by simple ways and means.

The achievement of this objective for a weatherseal assembly having the aforementioned features as set forth in claim 1 is provided in accordance with the invention by the abutment lip now comprising a first leg and a second leg extending at an angle to the first leg in the first position. The first leg is connected at one end to the sealing lip and at the other end to the second leg. The second leg is deformable by the body part such that the first leg moves the sealing lip from the first position into the second position.

The weatherseal assembly in accordance with the invention is based on having discovered that configuring the abutment lip with a first leg and a second leg extending at an angle thereto now permits, as compared to prior art, a higher variability as regards fitting a body part, for instance, a trim item in the passenger compartment of a motor vehicle. The reason for this is mainly that a wanted pivoting movement of the sealing lip is now primarily caused by a deformation of the second leg whereas the first leg has mainly the function of a lever handling the force required. A deformation of the second leg is, as a rule, also possible when, for example, a trim item leads to the abutment lip inclined. On top of this, the deformation of the second leg produces a tractive force in the first leg resulting in a relatively high force of the sealing lip contacting, for instance, a trim item.

Advantageous aspects of the weatherseal assembly in accordance with the invention read from the claims 2 to 11.

Thus, it is of advantage when the first leg and the second leg form an acute angle. An acute angle of less than 90° facilitates deformation of the second leg due to it then extending regularly inclined to the direction of the force exerted, for instance, by a trim item on the abutment lip. In this case, pivoting the sealing lip as wanted is even possible when, for instance, a trim item is moved practically parallel to the first leg in the direction of the abutment lip.

For a configuration in keeping with practical requirements it is furthermore of advantage to connect the sealing lip and/or the second leg to the fastening portion at a joining location. This joining location of the sealing lip to the fastening portion forms to advantage a fulcrum for the sealing lip. It is in this way that the sealing lip is pivoted about the fulcrum from the first position into the second position.

In another preferred embodiment of the weatherseal assembly in accordance with the invention sealing lip, first leg, second leg and fastening portion form a hollow chamber. The hollow chamber contributes towards a configuration closed to the exterior preventing foreign particles from becoming lodged between the first leg and second leg detrimenting the wanted deformation of the second leg and thus ensuring reliable contact of the sealing lip to, for instance, a trim item.

Preferably the sealing lip has a certain length and the first leg is connected to the sealing lip at a predefined spacing away from the fastening portion, this spacing preferably amounting to between 0.25% and 0.75% of the length of the sealing lip. Such a configuration has the advantage that the first leg is connected to the sealing lip at a location which ensures, for one thing, reliable pivoting of the sealing lip and, for another, a sufficient cross-sectional area of the sealing lip on, for instance, a trim item.

In another preferred embodiment of the weatherseal assembly in accordance with the invention the body part comprises a first portion which in the second position contacts the sealing lip and a second portion which in the second position contacts the first leg to achieve a functional decoupling effect. For this purpose it is additionally of advantage when the first portion and second portion of the trim item form preferably an acute angle.

To achieve reliable fastening of the weatherseal the fastening portion is advantageously configured with a roughly U-shaped cross-section and mounted on a flange preferably of a vehicle. Also contributing towards a reliable fastening is to expediently reinforce the fastening portion by a carrier, which is preferably made of metal. The carrier ensures adequate stiffness of the fastening portion and thus enables the weatherseal in another preferred embodiment of the weatherseal assembly in accordance with the invention to be made of an elastomeric material, preferably a thermoplastic elastomer or ethylene propylene diene rubber (EPDM). It is in this way that the weatherseal can be fabricated relatively simply and cost-effectively.

BRIEF DESCRIPTION OF THE SEVERAL VIEWS OF THE DRAWING(S)

Further advantages of the weatherseal assembly in accordance with the invention will now be detailed in a description of a preferred example embodiment with reference to the drawings depicting the example embodiment merely diagrammatically, in which.

DETAILED DESCRIPTION OF THE INVENTION

Figure 1:
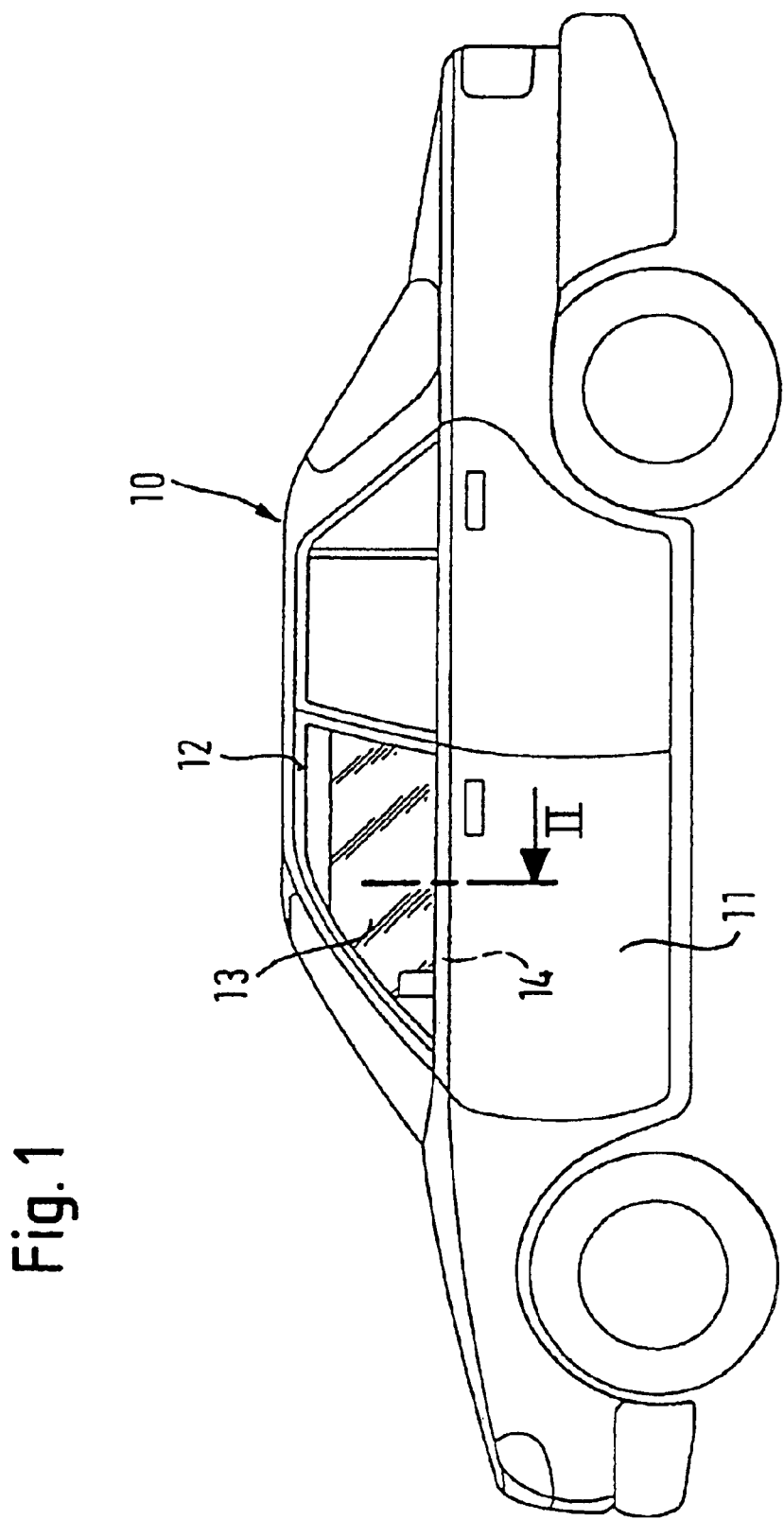
FIG. 1 is a side view of a motor vehicle.

Referring now to FIG. 1 there is illustrated a motor vehicle 10 provided with a door 11 comprising a frame 12. Arranged within the frame 12 is a powered window pane 13. The window pane 13 is sealed by a weatherseal 20 secured to a flange 15 of the door 11. For this purpose the weatherseal 20 comprises in addition to a portion adjoining the inner seal of the window pane 13 a fastening portion 22 configured with a roughly U-shaped cross-section. The fastening portion 22 is reinforced by a carrier, which is preferably made of metal (not shown in FIGS. 2 and 3) to endow the weatherseal 20 made, for instance, of a thermoplastic elastomer or EPDM with sufficient rigidity for reliably fastening in the region of the fastening portion 22. The fastening portion 22 comprises furthermore a recess 29 mounted on the flange 15, as evident from FIGS. 2 and 3. Arranged in the recess 29 are retaining lips (not shown) connecting the fastening portion 22 to the flange 15 positively and/or non-positively.

Figure 2:
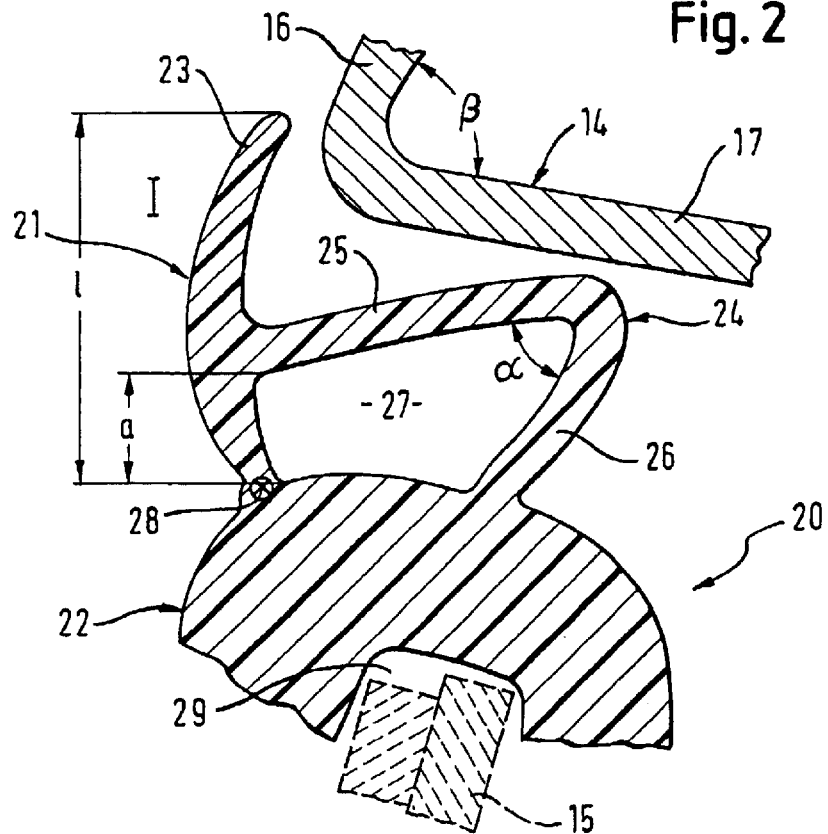
FIG. 2 is a cross-section taken along the line II in FIG. 1 through a weatherseal assembly in a first position of a sealing lip and FIG. 3 is a cross-section as shown in FIG. 2 but in a second position of the sealing lip.
Figure 3:
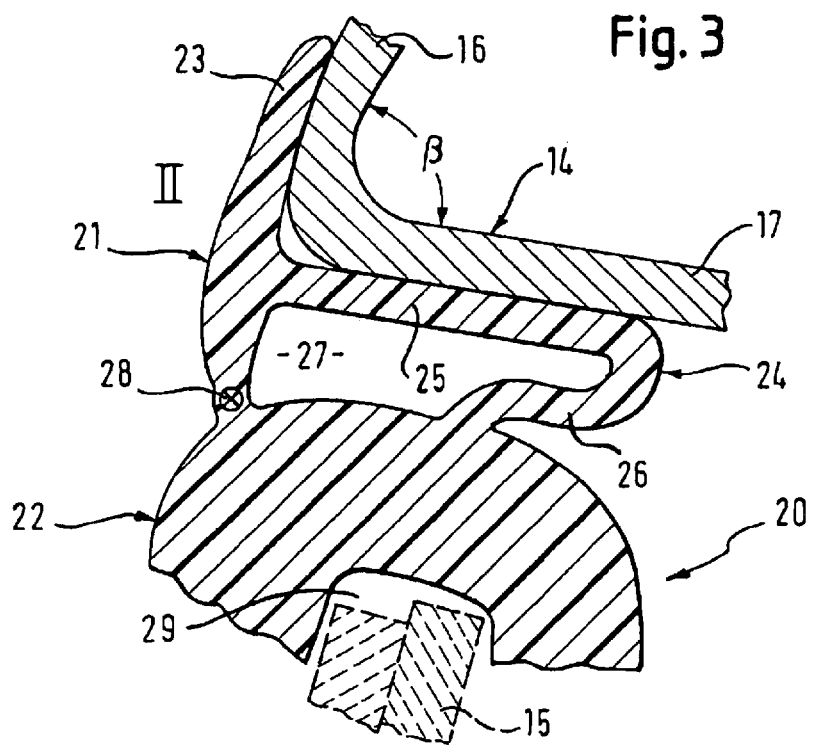

Referring now to FIGS. 2 and 3 there is illustrated how the weatherseal assembly comprises a trim item 14 secured in the passenger compartment of the vehicle 10 to the door 11. The trim item 14 is sealed by a sealing portion 21 of the weatherseal 20. The sealing portion 21 is provided with a sealing lip 23 pivotable about a fulcrum 28 from a first position I into a second position II and with an abutment lip 24 leading the sealing lip 23.

As evident from FIGS. 2 and 3 furthermore, the abutment lip 24 comprises a first leg 25 and a second leg 26 extending in the first position I of the sealing lip 23 at an acute angle α to the first leg 25. The first leg 25 is connected at one end to the sealing lip 23 and at the other end to the second leg 26, the second leg 26 being molded at one end on the fastening portion 22, whereas the sealing lip 23 is connected to the fastening portion 22 in the fulcrum 28. The first leg 25 is arranged at a spacing a from the fastening portion 22. The spacing a amounts to roughly 40% of the length I of the sealing lip 23. It is in this way that sealing lip 23, first leg 25, second leg 26 and fastening portion 22 form a hollow chamber 27.

In the fitted condition of the trim item 14 the sealing lip 23 is in the second position II. As evident from FIG. 3 the sealing lip 23 is in sealing contact with the trim item 14 in the second position II, whereas in the first position I there exists between the sealing lip 23 and trim item 14 a sufficient spacing ensuring simple fitting of the trim item 14, as evident from FIG. 2. To fit the trim item 14 it is moved in the direction of the abutment lip 24. When the trim item 14 comes into contact with the abutment lip 24 the second leg 26 is deformed. This deformation of the second leg 26 produces in the first leg 25 a tractive force which moves the sealing lip 23 from the first position I into the second position II, pivoting the sealing lip 23 about the fulcrum 28 and urging it against the trim item 14. As a result, sealing lip 23 in the second position II is in sealing contact with a first portion 16 of the trim item 14. At the same time the second portion 17 of the trim item 14 comes into contact with the first leg 25, as evident from FIG. 3. The first portion 16 and second portion 17 of the trim item 14 form an acute angle β. This results in the trim item 14 in the fitted condition, i.e. in the second position II, being clasped positively by the sealing lip 23 and the first leg 25. This positive contact counteracts return deformation of the second leg 26 in thus contributing towards a durable residence of the sealing lip 23 in the second position II.

The weatherseal assembly as described above is characterized by a wanted pivoting action and a relatively high contact force of the sealing lip 23. The reason for this is primarily the deformation of the second leg 26 producing a tractive force in the first leg 25 in urging the sealing lip 23 against the first portion 16 of the trim item 14. The deformation of the second leg 26 caused by the movement of the trim item 14 in the direction of the abutment lip 24 on being fitted depends, among other things, mainly on the angle α between the first leg 25 and the second leg 26. Accordingly, varying the angle α permits defining pivoting of the sealing lip 23 from the first position I into the second position II and thus the contact force with which the sealing lip 23 is urged against the first portion 16 of the trim item 14 to be adapted to the particular application. The angle α can be varied for example, for one thing, by the length of the first leg 25 and, for another, by the position of the joining location of the second leg 26 and the fastening portion 22. Last but not least, the hollow chamber 27 formed by the sealing lip 23, abutment lip 24 and fastening portion 22 permits an unobstructed, reversible deformation of the second leg 26 such that repeat fitting of the trim item 14, for instance in maintenance and repair, is assured.

What is claimed is:

1. A weatherseal assembly, for sealing a trim item arranged on a motor vehicle, including a body part and a weatherseal comprising a sealing portion and a fastening portion, said sealing portion being provided with a pivotable sealing lip and an abutment lip leading said sealing lip such that when said abutment lip comes into contact with said body part said sealing lip is pivotable from a first position into a second position contacting said body part, said abutment lip comprising a first leg and a second leg extending at an angle to said first leg in said first position, said first leg being connected at one end to said sealing lip and at the other end to said second leg, said second leg being deformable by said body part such that said first leg moves said sealing lip from said first position into said second position.

2. The weatherseal assembly as set forth in claim 1, wherein said first leg and said second leg form an acute angle.

3. The weatherseal assembly as set forth in claim 1, wherein said sealing lip and said second leg are connected to said fastening portion at a joining location.

4. The weatherseal assembly as set forth in claim 3, wherein said joining location of said sealing lip and said fastening portion forms a fulcrum for said sealing lip.

5. The weatherseal assembly as set forth in claim 3, wherein said sealing lip, said first leg, said second leg, and said fastening portion form a hollow chamber.

6. The weatherseal assembly as set forth in claim 3, wherein said sealing lip has a certain length and said first leg is connected to said sealing lip at a predefined spacing away from said fastening portion, said spacing amounting to between 0.25% and 0.75% of said length of said sealing lip.

7. The weatherseal assembly as set forth in claim 1, wherein said body part comprises a first portion which in said second position contacts said sealing lip and a second portion which in said second position contacts said first leg.

8. The weatherseal assembly as set forth in claim 7, wherein said first portion and said second portion of said body part include an acute angle.

9. The weatherseal assembly as set forth in claim 1, wherein said fastening portion has a roughly U-shaped cross-section and is mounted on a flange of a motor vehicle.

10. The weatherseal assembly as set forth in claim 1, wherein said fastening portion is reinforced by a carrier, which is made of metal.

11. The weatherseal assembly as set forth in claim 1, wherein said weatherseal is extruded from an elastomeric material.

12. The weatherseal assembly as set forth in claim 11, wherein said elastomeric material is selected from the group consisting of thermoplastic elastomer and ethylene propylene diene rubber.

* * * * *